Figure 1:
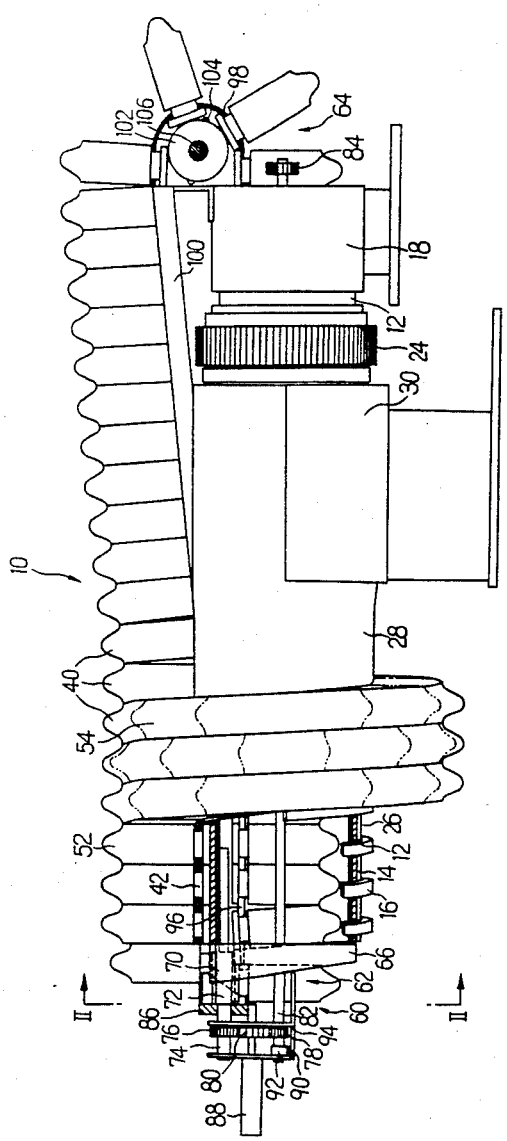

United States Patent [19]

Lupke

[11] Patent Number: 4,521,270

[45] Date of Patent: Jun. 4, 1985

[54] APPARATUS FOR FORMING SPIRALLY WOUND PIPE

[76] Inventor: Manfred A. A. Lupke, 92 Elgin St., Thornhill, Ontario, Canada, L3T 1W6

[21] Appl. No.: 583,310

[22] Filed: Feb. 24, 1984

[30] Foreign Application Priority Data

Apr. 6, 1983 [CA] Canada ................................. 425277

[51] Int. Cl.³ ............................................ B29D 23/04
[52] U.S. Cl. .................................... 156/429; 156/143; 156/189; 156/195; 156/244.13; 156/446; 156/500
[58] Field of Search ........... 156/143, 189, 195, 244.13, 156/429, 443, 446, 448, 456, 457, 500

[56] References Cited

U.S. PATENT DOCUMENTS

| | | | |
|---|---|---|---|
| 3,655,489 | 4/1972 | Poulson | 156/446 |
| 3,837,970 | 9/1974 | Medrano | 156/446 |
| 4,174,984 | 11/1979 | Meadows | 156/143 |
| 4,213,811 | 7/1980 | Hall et al. | 156/446 |

Primary Examiner—Caleb Weston

[57] ABSTRACT

An apparatus for producing spirally wound thermoplastic pipe. The apparatus has a helical track and a series of independent moldblocks that run in the track to provide a mandrel surface that rotates and advances axially. A band of thermoplastic material is extruded onto the mandrel surface and wound on the surface in an overlapping helix. The apparatus is equipped with a moldblock return mechanism that receives blocks from the downstream end of the track and returns them to the upstream end, so that unlimited lengths of pipe can be produced.

9 Claims, 5 Drawing Figures

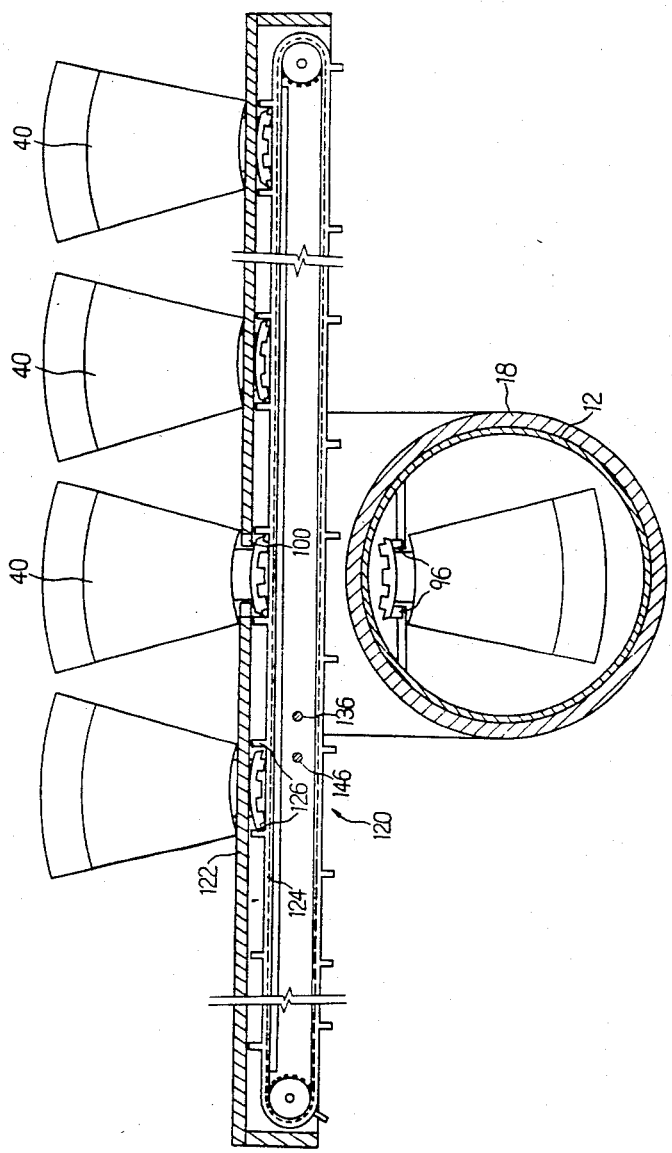

APPARATUS FOR FORMING SPIRALLY WOUND PIPE

The present invention relates to an apparatus for forming spirally wound pipe. The invention relates most particularly to an apparatus including a helical track and a plurality of independent moldblocks adapted to travel serially along the track so as to define a rotating and axially advancing mandrel surface.

An apparatus of this type is disclosed U.S. Pat. No. 4,174,984 issued Nov. 20, 1979 to Roger D. Meadows. The disclosed apparatus is used to produce small diameter smooth walled pipe. The size of the pipe produced can be changed simply by replacing the blocks with blocks of a different size. The known apparatus is, however, subject to certain limitations. With the known apparatus, the moldblocks are dropped one by one into the formed pipe as the pipe leaves the mandrel and the blocks leave the helical track. In order to retrieve those blocks for re-use, it is necessary to cut the pipe into sections and dump out the moldblocks for return to the mandrel by a conveyor system that is not described in the patent specification. This procedure is inconvenient and and requires the maintenance of a large stock of expensive moldblocks.

The present invention overcomes these deficiencies by providing an apparatus of the aforesaid type that is characterized by:

(a) the track having a hollow core; and
(b) a block return system comprising:
(i) a block return passage extending along the hollow core of the helical track,
(ii) run-out means for transferring the blocks serially from the helical track to the return passage at a downstream position,
(iii) run-in means for transferring the blocks serially from the return passage to the track at an upstream position, and
(iv) return drive means for driving the blocks serially through the block return system.

The automatic return of the blocks eliminates the laborious and inconvenient procedure of the prior art. Because the blocks are returned through the center of the mandrel, it is not necessary to cut the pipe to retrieve the blocks. This means that the presence of blocks inside the pipe does not put a practical limit on the pipe length that can be produced. Because the blocks are returned without delay to the track at the upstream position, a relatively small number of blocks may be used.

In preferred embodiments of the invention each moldblock consists of a carrier that is driven along the track and through the return system and a profile block removably mounted on the carrier. The profile blocks co-operate to define the mandrel surface.

It is further preferred that the run-out means guide the blocks through an arcuate path of dimenishing radius from the helical track to the return passage. It is desirable for the arcuate path to have the same pitch as the helical track. This allows the use of blocks for producing a corrugated pipe. The blocks are withdrawn to the centre of the pipe, free from engagement with the corrugations without interferring with the corrugations in the formed pipe.

The apparatus may also be equipped with a moldblock accumulator, associated with the run-in means and a moldblock switch for selectively diverting blocks from the run-in to the accumulator and from the accumulator to the run-in. This enables a change in the pipe profile during production, for example to allow the insertion of bell or spigot connectors at selected intervals along the pipe.

Figure 2:
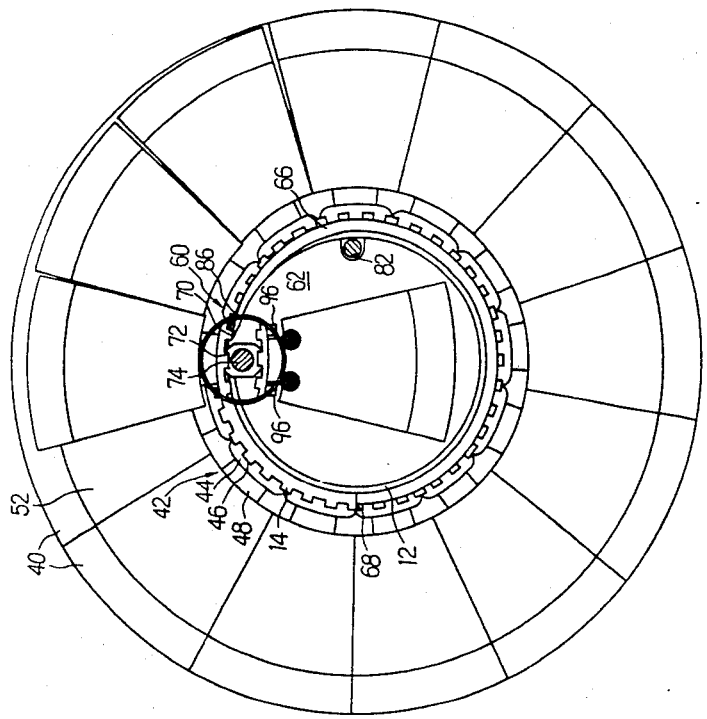
Figure 3:
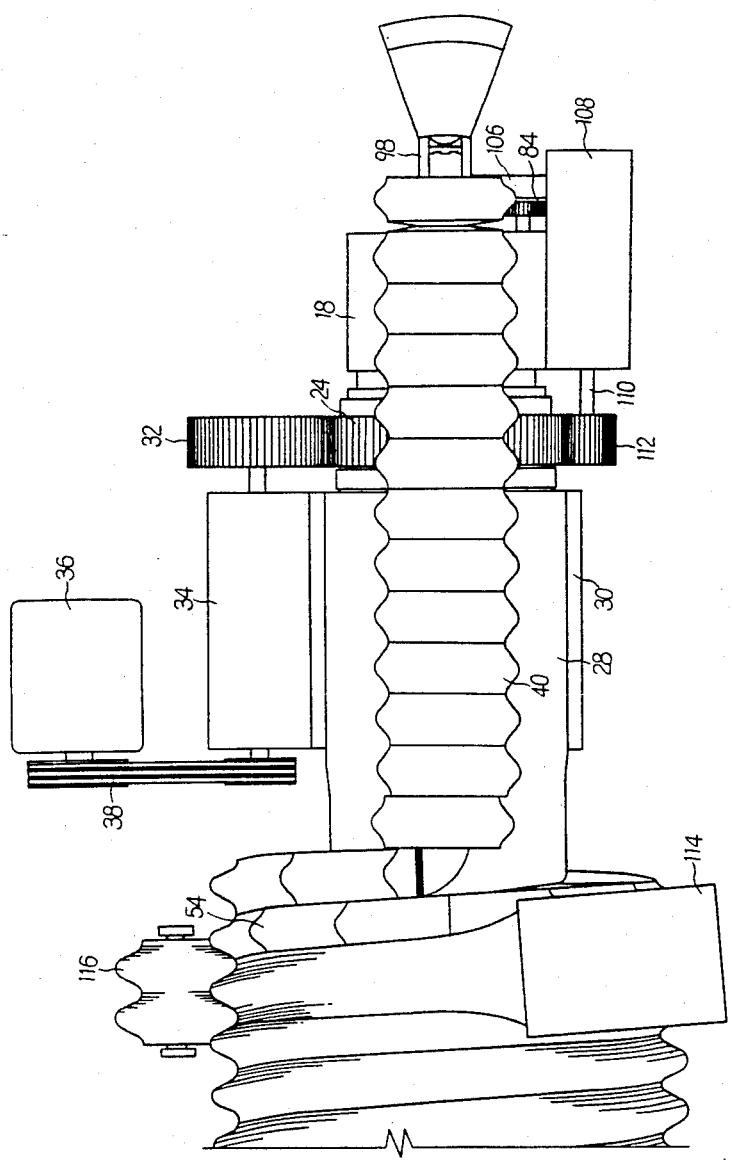
Figure 4:
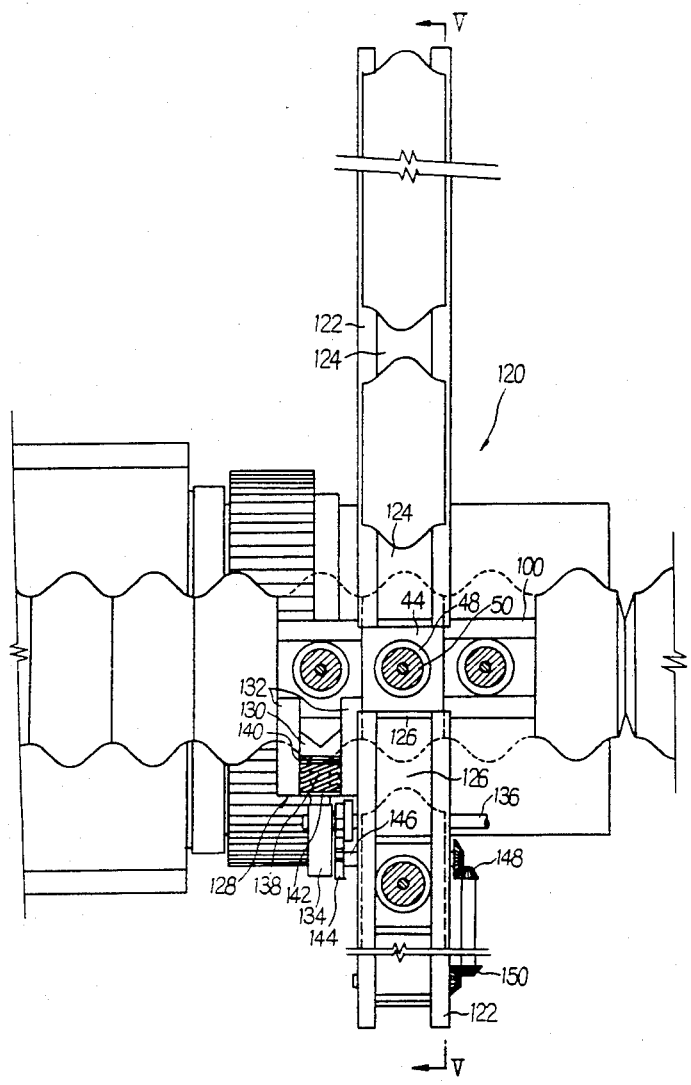

In the accompanying drawings, which illustrate exemplary embodiments of the present invention:

FIG. 1 is a schematic side elevation, partially in section of an apparatus according to the present invention:
FIG. 2 is a view along line of II—II of FIG. 1.
FIG. 3 is a plan view of the apparatus of FIG. 1:
FIG. 4 is a partial plan view of an accumulator and a moldblock switch for use with the apparatus; and
FIG. 5 is a view along line V—V of FIG. 4.

Referring to the drawings, particularly to FIGS. 1, 2 and 3, the illustrated apparatus 10 has a main assembly consisting of three concentric units, a stationary inner tube 12, a rotating spline tube 14 surrounding the inner tube 12 and a stationary track tube 16 surrounding the spline.

As shown most particularly in FIGS. 1 and 3, the inner tube 12 is mounted at its upstream end in a stationary support 18. The spline 14 has a toothed downstream end and a smooth walled upstream end. The smooth upstream end of the spline is located adjacent the support 18 and carries an external ring gear 24 which, when driven, rotates the spline.

The track tube 16 has a downstream section that has a helical slot 26 from the downstream end to a position on the top of the main assembly just upstream of the teeth of the spline tube 14. The unslotted upstream section 28 of the tube 16 is mounted on a stationary support 30.

As illustrated in FIG. 3, the ring gear 24 is driven by a pinion 32 on the output of a gear reducer 34. The gear reducer input is connected to the drive shaft of an electric motor 36 through a series of drive belts 38.

The main assembly carries a series of moldblocks 40. Each block has a carrier 42 with a curved base plate 44 grooved on the undersurface 46 to match the teeth of the spline tube 14. The upper surface of the plate carries a cylindrical bushing 48 that rotates freely on a boss 50 on the upper surface of the base plate 44. This arrangement is most clearly illustrated in FIG. 4.

As can be seen most readily from FIGS. 1 and 2, when a moldblock is engaged in the helical track defined by the slot in tube 16, its carrier base plate 44 has the grooves in its bottom surface engaged with the teeth on the spline tube 14. The bushing 48 projects through the slot and those portions of the base plate upstream and downstream of the bushing project under adjacent turns of the track. Upon rotation of the snline tube 14, the carrier is driven along the helical track through its axial sliding engagement with the spline and the engagement of the bushing 48 with the helical track.

Each moldblock 40 also includes a profile block 52 mounted on the outer end of the boss 50. Each profile block is configured such that along the helical track it engages the leading and trailing profile blocks and the adjacent profile blocks in the next upstream and downstream turns of the helical tracks. The result is a solid tube of profile blocks surrounding the main assembly that continuously rotates and axially advances in the downstream direction when the spline is driven.

In the illustrated embodiment, the profile blocks are identically configured so as to be interchangeable. The blocks provide an outer mandrel surface 54 of corrugated form.

The apparatus is equipped with a moldblock return system for returning the moldblocks from the downstream end of the helical track to its upstream end so that a continuous, uninterrupted flow of blocks can be maintained. The block return system includes a run-out 60 at the downstream end of the apparatus for transferring moldblocks serially from the helical track to a return passage at 62 extending along the hollow core of the inner tube 12. A run-in mechanism 64 at the upstream end of the apparatus transfers blocks from the return passage 62 to the helical track.

As illustrated most particularly in FIGS. 1 and 2, the run-out includes a curved guide plate 66 that extends axially from the end of the spline tube 14 and widens from its leading end 68 to its trailing end 70, where the plate has a width equivalent to the axial length of a moldblock carrier 42. As can be seen from FIG. 2, the trailing portion of the guide plate 66 spirals inwardly towards the center of the main assembly, while the remainder of the plate has an outer surface that is flush with the dedendum circle of the spline tube 14. The guide plate 66 is secured to the inner tube 12 and serves to guide the downstream ends of the moldblock carriers 42 as they leave the end of the spline tube 14. Where the radius of the guide plate 66 begins to diminish, the carriers 42 of the moldblocks have completely disengaged from the spline tube 14. As a result, the moldblocks will begin to move radially inwardly from the mandrel surface to disengage from the formed pipe.

As a moldblock carrier 42 leaves the guide plate 66, the grooved lower surface of the carrier engages a grooved surface on an indexing rotor 72. The rotor is mounted on a shaft 74 driven by a gear 76, which is in turn driven by a pinion 78 through an idler 80. The pinion 78 is carried by a shaft 82 that extends along the inside of the inner tube 12 and carries a gear 84 at its upstream end.

The base plate 44 of the moldblock carrier 42 has rounded upper leading and trailing corners that engage the inner face of a cylindrical guide 86 mounted concentrically about the indexing rotor 72. The guide 86 serves to retain the carrier base plate 44 on the rotor as the moldblock is being rotated from a position with the profile block uppermost to an inverted position aligned with the hollow core of the inner tube 12. The upstream edge of the guide 86 is shaped to allow the moldblocks to follow a path with the same helical pitch as that of the helical track. This ensures that the moldblock will not interfere with the corrugations in a corrugated pipe before the block reaches the inverted position aligned with the inner tube 12.

When a moldblock reaches the inverted position, it is pushed upstream along the center of the inner tube 12 by an air cylinder 88. The cylinder is actuated in timed sequence with the arrival of the moldblock at the inverted position by a valve 90 operated by a cam 92 on the shaft 82. As illustrated in FIG. 1, the elements of the run-out mechanism are mounted on a bracket 94 that is itself secured to the inner tube 12.

After the moldblocks are pushed out of the guide 86, they engage a pair of rails 96 that run the length of the inner tube 12 and support the carrier base plate 44. On each stroke of the air cylinder 88, all of the moldblocks along the tracks 96 are advanced one moldblock length.

Where the moldblocks emerge from the inner tube 12, they enter an arcuate track 98 of the run-in 64. This track leads from the rails 96 to a ramp 100 that in turn leads the moldblocks to the upstream end of the helical track. The moldblocks are driven through the track 98 by a rotor 102 with spring loaded buttons 104 projecting from its peripheral surface. The spring loading of the buttons is sufficiently strong that the buttons will drive the individual moldblocks around the track 98 but will yield when a driven moldblock engages the next leading moldblock at the upstream end of the ramp 100. This accomodates the intermittent nature of the moldblock travel along the return passage and into the helical track.

As illustrated in FIG. 3 the gear 84 on the shaft 82 and the shaft 106 of the rotor 102 are driven from a gear box 108 mounted on the side of the support 18. The gear box 108 has an input shaft 110 with a gear 112 meshing with the ring gear 24.

FIG. 3 also includes a schematic illustration of an extruder die 14 for extruding a thermoplastic material band 116 onto the mandrel surface. The band is wound onto the surface in overlapping windings as the mandrel surface rotates and advances axially. A presser roll is located adjacent the mandrel surface to press the extruded thermoplastic band onto the roll and most particularly to press upon the overlapping portions of the band to ensure their proper fusing The roller is biased against the mandrel surface by an air cylinder that is not illustrated in the drawings.

Turning to FIGS. 4 and 5, these drawings illustrate an accumulator and moldblock switch that may be used in conjunction with the ramp 100 of the run-in to provide for an automatic exchange of moldblocks during continuing operation of the apparatus. The accumulator 120 includes a track 122 extending from each side of the ramp 100 to accomodate the base plates of moldblock carriers. The base of the track is defined by a timing belt 124 running around two pulleys 125 at the remote ends of the two tracks 22. The outer surface of the belt 124 carries flights 126 arranged in pairs with the flights of each pair spaced so as to accomodate the base plate of a moldblock carrier between them. The pairs are in turn spaced from one another so that adjacent moldblocks will not interfere with one another.

Immediately downstream of the tracks 122 is a moldblock retainer 128. This includes a V shaped gripper 130 with upstream and downstream edges riding in respective guides 132. The gripper is reciprocated in its guides 132 by a cam 134 mounted on a shaft 136 driven from the gear box 108 (FIG. 3). The gripper is biased away from the ramp 100 by a coil spring 138 acting between spring retainers 140 and 142 on the guides and the gripper respectively.

The shaft 136 is also the input shaft for an intermittent drive mechanism 144, in the illustrated embodiment a conventional Geneva wheel mechanism with an output shaft 146. The output shaft 146 acts through a drive train including two pairs of bevel gears 148 and 159 to drive one of the pulleys for belt 124.

In operation of the moldblock switch and accumulator mechanism the shaft 136 is driven continuously. At intervals determined by the setting of cam 134, the gripper 130 is advanced to engage the bushing 48 on a moldblock carrier 42. This fixes the associated moldblock in place and also locates the following moldblock in alignment with the tracks 122 of the accumulator 120. While this positional relationship is being maintained by the gripper 130, the intermittent drive 144 acts to advance the gear belt 124, thus displacing the moldblock in the ramp 100 that is aligned with the track 122 into one of the tracks and bringing a replacement moldblock from the other track 122 into the ramp 100. The cam 134 then releases the gripper from the bushing 48. The moldblocks are allowed to advance a distance of one moldblock further along the ramp 100 until the gripper is again actuated. As will be apparent a complete sequence of moldblocks can thus be replaced by engaging the drive for the shaft 136.

Where the removable blocks are to be reinserted, the shaft 136 is driven in the opposite direction.

While one embodiment of the invention has been described in the foregoing, it is to be understood that the invention is not limited to that embodiment. It is, for example, possible to use a run-out with a clamping finger arrangement instead of the indexing rotor and the cylindrical guide. The air cylinder may be replaced with a mechanically operated pusher driven with an intermittent drive or a quick return mechanism. The spline tube used to drive the moldblocks along the track may be replaced with a series of smaller driving splines spaced around the interior of the track tube.

I claim:

1. An apparatus for use in the manufacture of spirally wound pipe, including a helical track and a plurality of independent moldblocks adapted to travel serially along the track so as to define a rotating and axially advancing mandrel surface, characterized by:
   (a) the track having a hollow core; and
   (b) a block return system comprising:
   (i) a block return passage extending along the hollow core of the helical track,
   (ii) run-out means for transferring the blocks serially from the helical track to the return passage at a downstream position,
   (iii) run in means for transferring the blocks serially from the return passage to the track at an upstream position, and serially through the block return system.
   (iv) return drive means for driving the blocks serially through the block return system.

2. An apparatus according to claim 1 further characterized in that each block comprises a carrier adapted to be driven along the track and through the return system and a profile block mounted on the carrier, the profile blocks co-operating along the track to define the mandrel surface.

3. An apparatus according to claim 2 further characterized in that each profile block is removably mounted on its carrier.

4. An apparatus according to claim 1, 2 or 3 characterized by a mandrel surface with helical corrugations.

5. An apparatus according to claim 1 characterized in that the run-out means comprise means for guiding the blocks through an arcuate path of diminishing radius from the track to the return passage.

6. An apparatus according to claim 5 characterized in that the arcuate path of diminishing radius has the same pitch as the helical track.

7. An apparatus according to claim 6 characterized by the return drive means including pushing means for pushing the blocks along the return passage.

8. An apparatus according to claim 1, characterized by an extruder for extruding a band of thermoplastic material onto the mandrel surface so as to be wound on the mandrel surface in an overlapping helix.

9. An apparatus according to claim 1, characterized by a block accumulator means for selectively diverting blocks from the run-in means to the accumulator and from the accumulator to the run-in means.

* * * * *